United States Patent [19]

Slater

[11] 4,033,703
[45] July 5, 1977

[54] DRILL BIT FOR COUPLING TO A WIRE FISHING ADAPTER

[76] Inventor: Don Slater, 2542 Balfour, Fullerton, Calif. 92631

[22] Filed: Dec. 5, 1974

[21] Appl. No.: 529,627

[52] U.S. Cl. .................. 408/211; 254/134.3 FT; 403/354

[51] Int. Cl.² .......................................... B23B 51/08

[58] Field of Search ............... 408/211, 199, 241; 254/134.3 FT; 403/354, 301, 229

[56] References Cited

UNITED STATES PATENTS 1,009,492  11/1911  Dubruiel ........................... 403/301
3,675,898  7/1972  Fattor et al. ............... 254/134.3 FT
3,697,188  10/1972  Pope ..................... 254/134.3 FT X Primary Examiner—Frank T. Yost
Assistant Examiner—Z. R. Bilinskz
Attorney, Agent, or Firm—Morland C. Fischer

[57] ABSTRACT

A drill adapted to be detachably and pivotably linked to a wire fishing adapter for pulling wiring through a bored-out passage in a wall or the like, including a blade-type drill bit having a pin protruding from one of the faces of the drill bit blade, a rod having a pair of spaced-apart apertured fingers at one end and having a conically-shaped receptacle at the opposite end for lockable engagement with the end of a wire.

6 Claims, 5 Drawing Figures

DRILL BIT FOR COUPLING TO A WIRE FISHING ADAPTER

BACKGROUND OF THE INVENTION

1. Field of the Invention

This invention relates to blade-type drill bits, and more particularly to a drill bit which is adapted to be detachably and pivotably linked to a wire fishing adapter for pulling wire through the hole bored by the drill bit.

2. Description of the Prior Art

Installation of hidden wiring for various low-voltage electrical systems, such as telephones, public address systems, speaker systems for stereo components and the like, within existing walls of buildings, requires one or more holes to be drilled in the walls of the building through which the wiring is routed. This is typically accomplished by means of a drill, usually of the blade-type variety.

After the drill has bored through the various elements comprising the internal reinforcing and supporting structure of the wall, the wire or wire cable must be pulled or "fished" through the passageway bored in and through the wall.

One method used rather extensively for fishing the wire through the passageway drilled in the wall was to utilize a "fish tape." A fish tape is a reel of a length of relatively flat spring steel. The end of the fish tape is looped to form an eyelet. The fish tape is used quite simply by first inserting the eyelet end of the fish tape into the passageway. The fish tape is then simultaneously unreeled and pushed into the passageway. When the eyelet end of the fish tape reaches the opposite end of the bored out passageway in the wall, the wire is fixedly secured to the fish tape by passing it through the eyelet and wrapping the wire about its own body. The fish tape is then reeled in, thereby fishing the wire through the bored out passageway in the wall.

This method is especially suitable for relatively short runs. However, for long passageway runs, it becomes increasingly difficult in most walls, if not truly impossible, to direct the fish tape through the passageway to the other end thereof. The reason for this difficulty becomes clear when one considers how most building walls are constructed.

Most building walls are constructed using a pair of plaster-formed sheets or are faced with plasterboard sheets with two by four wooden studs sandwiched between the sheets on edge. The studs are spaced apart by some distance, generally in the order of 15 to 18 inches apart. In boring a passageway through and along the inside of the wall, it is necessary to bore through several studs.

In pushing the fish tape through the holes in the studs, alignment problems arise, thereby making it difficult to span long passageway runs through walls having this type of construction.

Another method used in the prior art eliminated the use of the fish tape. This was accomplished by drilling a hole through the body of the blade-type drill bit to allow the wire to be secured to the drill bit itself by looping the wire through the hole. When the drill bit is withdrawn from the passageway bored in the wall, the wire is fished through the passageway at the same time. However, utilization of this method is not without its problems.

For example, the wire loop which was formed as the wire was passed through the hole in the drill bit in many cases tends to form a wire bundle having a larger diameter than that of the passageway bored out by the drill bit. When this occurs, the wire cannot be pulled through the passageway.

Further, the looped portion of the wire once it has been fished through the passageway, must be cut off because substantial portions of the wire may be severed during the feed through process. Consequently, since the integrity of this portion of the wire is questionable, it must be removed before the wire is coupled to another group of wires or electrical/electronic components.

Another problem which oftentimes developes using the hole in the drill bit is that in fishing relatively soft copper wire, a sufficient shearing action may develop to sever the wire being pulled through the passageway.

It is due primarily to the above mentioned problems, as well as numerous other, which led to the discovery of the present invention hereinafter disclosed.

SUMMARY OF THE INVENTION AND OBJECTS

The present invention comprises, in substance, a drill adapted to be pivotably coupled, in a detachable fashion, to a wire fishing adapter, including a blade-type drill bit having a pin protruding from one of the faces of the drill bit body, an elongated member having a pair of spaced apart, apertured fingers at one end and having a tapered receptacle at the opposite end for lockably engaging the end of a wire.

One important object of the present invention is to provide a wire fishing tool which is detachably connectable to a blade-type drill bit.

Another primary object of the invention is to provide a wire fishing tool which is pivotably linked to a blade-type drill bit.

A further object of the invention is to provide a blade-type drill bit connectable to a wire fishing tool which will lockably engage the end of a wire.

The various features of novelty which characterize the invention are pointed out with particularity in the claims annexed to and forming a part of this Specification. For a better understanding of the invention, however, its advantages and specific objects attained with its use, reference should be made to the accompanying drawings and descriptive matter in which I have illustrated a preferred embodiment of the invention.

Accordingly, the accompanying drawings illustrate a preferred embodiment of the invention, in which:

DESCRIPTION OF THE PREFERRED EMBODIMENT

Figure 1:
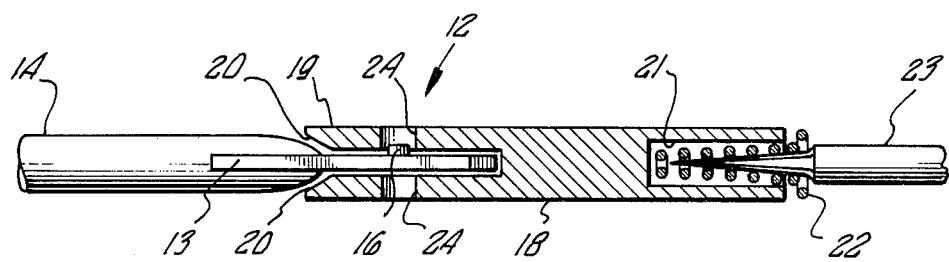
FIG. 1 is an assembly view of the present invention with the wire fishing adapter of FIG. 5 shown in section taken along Plane 1—1 of FIG. 5.

With continuing reference to the drawings, and more specifically, at this time, to FIG. 1, wherein the assembly comprising the instant invention is shown and illustrated in a detailed fashion, and which includes a blade-type drill bit indicated at 10, a wire-fishing adapter indicated at 11 and coupling means indicated at 12 for detachably coupling the bit 10 and adapter 11 together.

Figure 2:
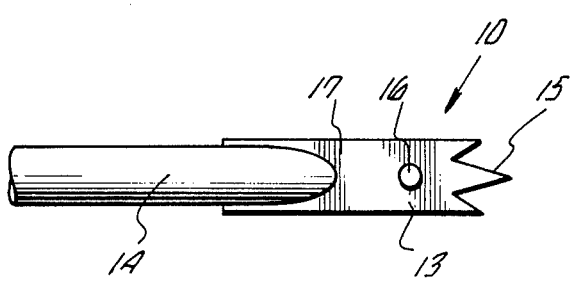
FIG. 2 is a plan view of the blade-type drill bit and showing a portion of the present invention.
Figure 3:
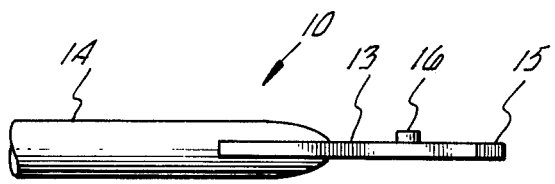
FIG. 3 is an edge view of the blade-type drill bit of FIG. 2.

Turning now to FIGS. 2 and 3, there is shown a portion of the present invention, namely, the blade-type drill bit 10. The drill bit 10 comprises a blade-like body 13, one end of which is fixedly secured to a shank 14 and the opposite end of which is configured to form a cutting and boring tip 15. A pin-like element 16 fixedly protrudes from a broad face 17 of the blade-like body 13 of the drill bit 10. Typically and conveniently, the pin-like element 16 is formed by dimpling, or partially punching out with a punch, a portion of the drill bit body 13. The function and purpose of the pin-like element 16 thereby formed will become clear as the description and discussion of the invention proceeds hereinafter.

Figure 4:
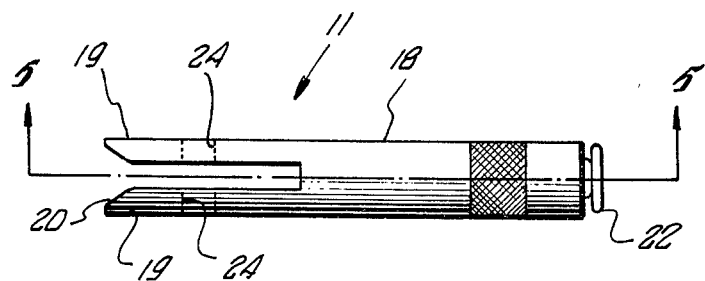
FIG. 4 is a side elevational view of the wire fishing adapter and illustrating another portion of the invention.

With particular emphasis now on FIG. 4, there is shown and illustrated a wire-fishing adapter 11. The adapter 11 generally comprises an elongated member or rod 18, one end of which is slotted to form a pair of spaced-apart fingers 19. The fingers 19 have a pair of oppositely disposed holes 24 therethrough and are radiused outwardly at the tips 20.

Figure 5:
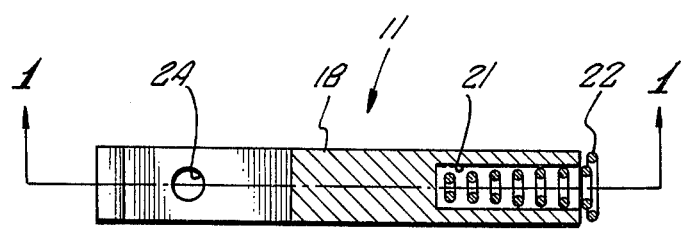
FIG. 5 is a sectional view of the wire fishing adapter of FIG. 4 taken along Plane 5—5 of FIG. 4.

Further, as clarly illustrated in FIG. 5, the opposite end of the rod 18 is bored out to form a passageway 21 within the rod 18. A helically-wound, conically shaped spring 22, a portion of which is larger in diameter than the diameter of the passageway 21, is slideably fitted and fixedly secured into the passageway 21, thereby creating a wire-holding receptacle therein for securing and retaining the end of a wire cable 23 therein, as previously illustrated in FIG. 6.

Use and operation of the present invention may be described and effectuated in the following manner. After the cutting and boring tip 15 of the drill bit 10 has bored a passageway through a wall or the like, the tip 15 will protrude out beyond the wall bored through. The wire cable 23 is then securely twisted into the spring 22 of the wire-holding receptacle located at one end of the wire-fishing adapter 11. Once this is accomplished, the slotted end of the rod 18 forming the body of the adapter 11 is slideably engaged with the blade-like body 13 of the drill bit 10, urging the tips 20 of the fingers 19 towards the drill shank 14. As this engagement progresses, one of the slightly radiused tips 20 is directed into contact with the pin element 16. When this occurs, the finger 19 engaging the pin element 16 is forced outwardly away from the body 13 of the drill bit 10. Subsequently, the hole 24 in the finger 19 is aligned with the pin element 16, thereby allowing the finger 19 to spring back towards the body 13 of the drill bit 10 and to surround the pin element 16, thereby effecting a detachable and pivotal coupling therewith. Once the coupling is achieved, the shank 14 of the drill bit 10 is used to withdraw the drill bit 10 and wire-fishing adapter 11 into and through the bored-out passageway thereby "fishing" the wire cable 23 therethrough.

Removal of the wire cable 23 from the spring 22 of the wire-holding receptacle of the adapter 11 is accomplished by reversing the cable installation process.

The adapter 11, in turn, may be decoupled from the drill bit 10 by expanding the fingers 19 to move clear from the pin element 16 and thereafter slideably pulling the drill bit 10 and the adapter 11 apart.

While the instant invention has been described with reference to a particular embodiment thereof, it will be readily understood that variations and modifications thereof may be made without departing from the spirit or scope of the instant invention.

For example, the pin element 16 could easily be placed in the slotted section of the rod 18 on the inside face of one of the fingers 19 and the hole 24 could be correspondingly placed through the blade-like body 13 of the drill bit 10. Also, the spring 22 could also be replaced by a conically-shaped, threaded passageway 21 to be used for fixedly engaging the wire cable 23.

Having now described my invention, what I claim as new and novel and which I desire to secure by Letters Patent of the United States of America, is:

1. A device for boring a passageway through a wall, or the like, and for fishing a wire through said passageway, comprising:
   a. A drill having a blade-type drill bit;
   b. At least one pin fixedly secured to and protruding from one of the two relatively broad faces of said blade-type drill bit;
   c. A rod having an axially-disposed passageway in one end and a pair of axially-extending fingers in the other end, said fingers being spaced-apart a distance slightly greater than the thickness of the edge of said blade-type drill bit and having a journal in at least one of said fingers for pivotally capturing said pin; and
   d. Wire coupling means disposed in said rod passageway and anchored to said rod for removably coupling said wire to said rod.

2. The device of claim 1, wherein the ends of said fingers are radiused for guiding said drill bit into the space between said fingers.

3. The device of claim 2, wherein said other of said fingers has a journal for pivotally capturing said pin.

4. The device of claim 3, wherein said wire coupling means comprises a conically-shaped, helically-wound spring disposed in said rod passageway and anchored to said rod.

5. The device of claim 3, wherein said wire coupling means comprises a rod passageway having a threaded rod wall thereabout.

6. The device of claim 5, wherein said threaded passageway is progressively tapered from the end of said rod.

* * * * *